United States Patent
Huang

(10) Patent No.: US 8,385,168 B2
(45) Date of Patent: Feb. 26, 2013

(54) MEASURING APPARATUS FOR HARD DISK DRIVE

(75) Inventor: Fa-Sheng Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 12/981,523

(22) Filed: Dec. 30, 2010

(65) Prior Publication Data
US 2012/0163144 A1    Jun. 28, 2012

(30) Foreign Application Priority Data
Dec. 23, 2010    (CN) .......................... 2010 1 0602350

(51) Int. Cl.
*G11B 7/00* (2006.01)
(52) U.S. Cl. ............... 369/53.1; 369/124.01; 360/75
(58) Field of Classification Search .................. None
See application file for complete search history.

(56) References Cited

U.S. PATENT DOCUMENTS 5,668,679 A * 9/1997 Swearingen et al. ........... 360/75
6,396,652 B1 * 5/2002 Kawachi et al. ................ 360/75

* cited by examiner

*Primary Examiner* — Muhammad N Edun
(74) *Attorney, Agent, or Firm* — Altis Law Group, Inc.

(57) ABSTRACT

A measuring apparatus includes a first connector connected to a storage controller through a second connector of a motherboard. A control circuit receives voltage signals from the storage controller and converts the voltage signals to hard disk drive (HDD) power signals. A detecting circuit includes an AND gate and first to fourth resistors. A first input terminal of the AND gate is grounded through the first resistor and connected to the control circuit through the second resistor. A second input terminal of the AND gate is grounded through the third resistor and connected to the control circuit through the fourth resistor. An output terminal of the AND gate is connected to a measuring pin of the first connector. The AND gate receives the HDD power signals and outputs a power good (PWG) signal to the measuring pin of the first connector to be measured.

4 Claims, 4 Drawing Sheets

MEASURING APPARATUS FOR HARD DISK DRIVE

BACKGROUND

1. Technical Field

The present disclosure relates to measuring apparatuses, and particularly to a measuring apparatus for a hard disk drive (HDD).

2. Description of Related Art

Power good (PWG) signals sent by a hard disk drive (HDD) indicates the HDD is working properly. Thus, after manufacture but before delivery to the customer, the PWG signal needs to be tested, to ensure quality of the HDD. However, a traditional testing way is to plug or unplug the HDD to or from a motherboard to trigger the PWG signals, the repeated plugging, or unplugging may easily damage the HDD.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of examples and not by limitation. It should be noted that references to "an" or "one" embodiment in this disclosure are not necessarily to the same embodiment, and such references mean at least one.

Figure 1:
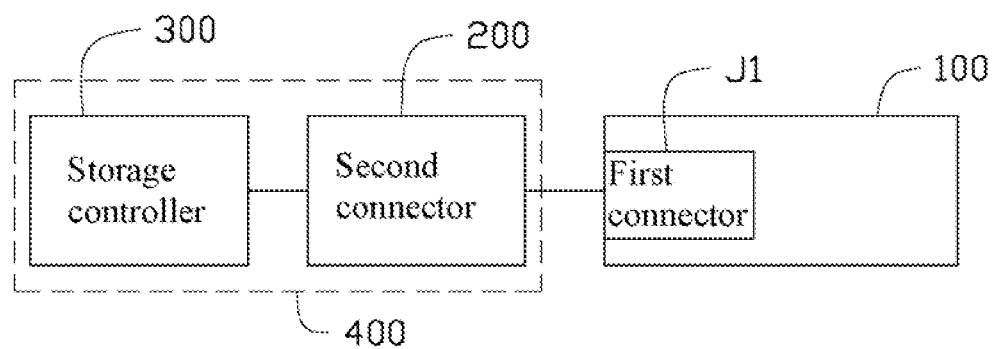
FIG. 1 is a schematic diagram of a measuring apparatus for a hard disk drive (HDD) connected to a storage controller through a second connector.
Figure 2:
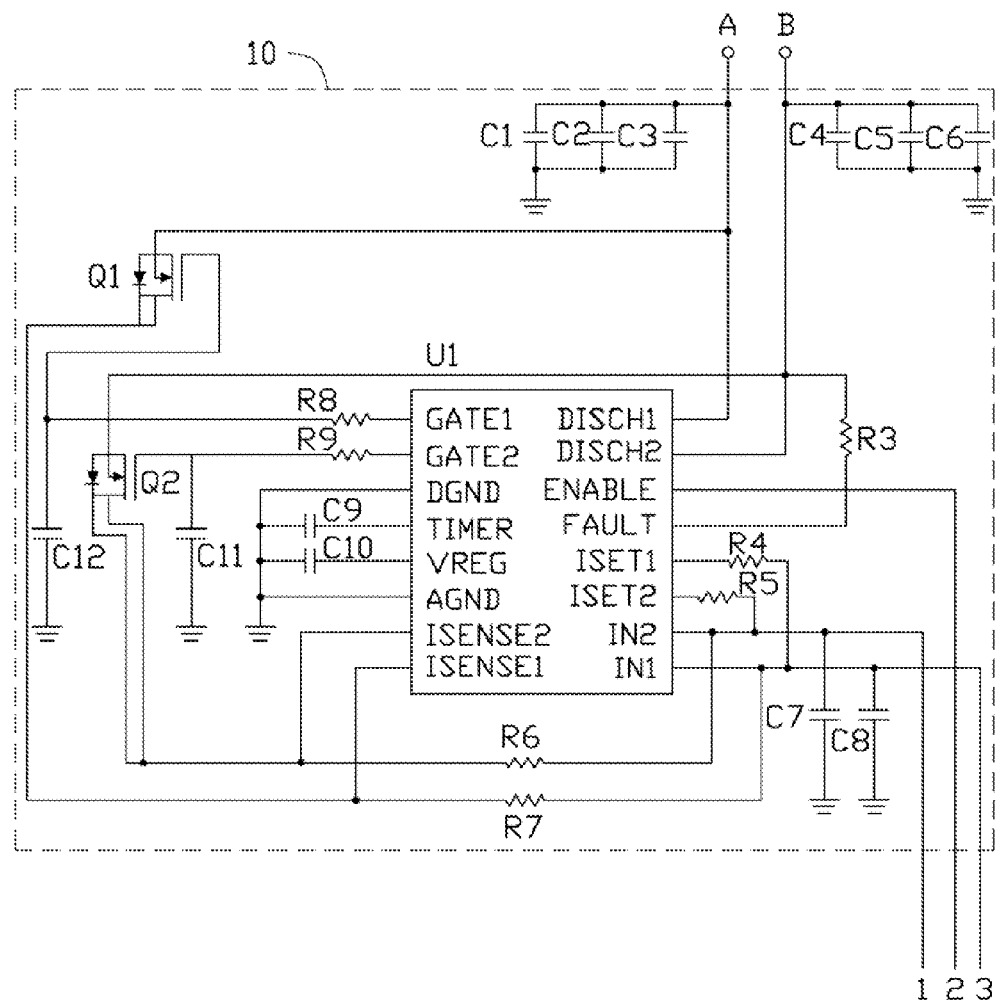
FIG. 2 to FIG. 4 are circuit diagrams of the measuring apparatus of FIG. 1 in accordance with an exemplary embodiment of the present disclosure.
Figure 3:
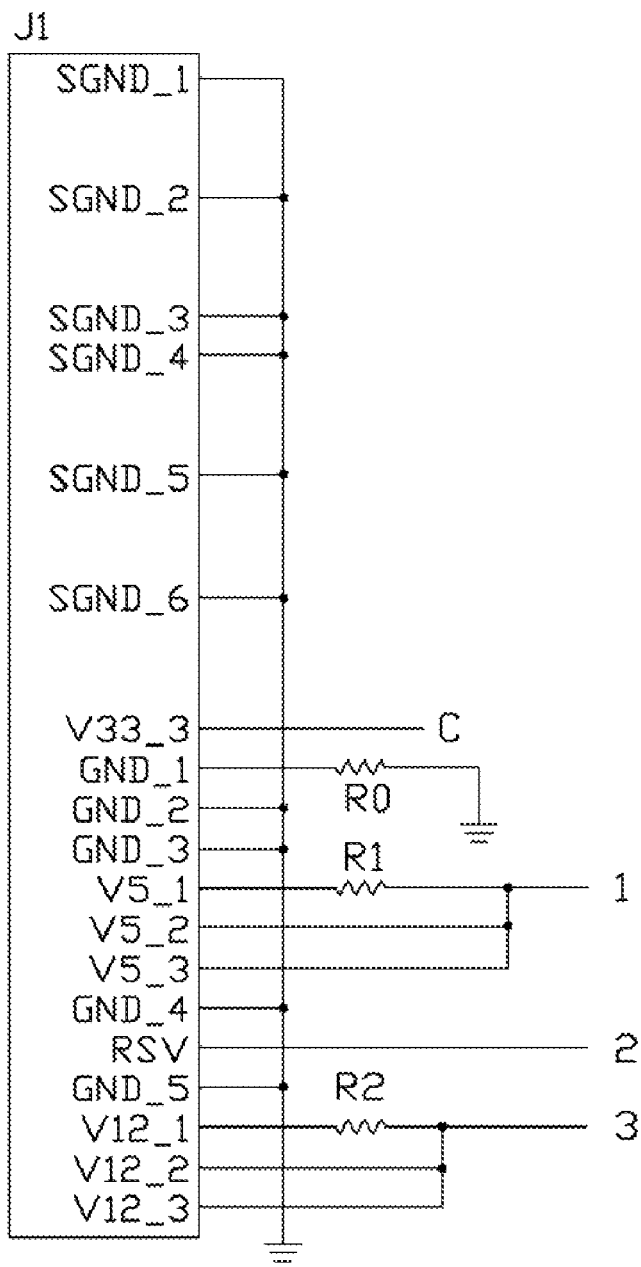
Figure 4:
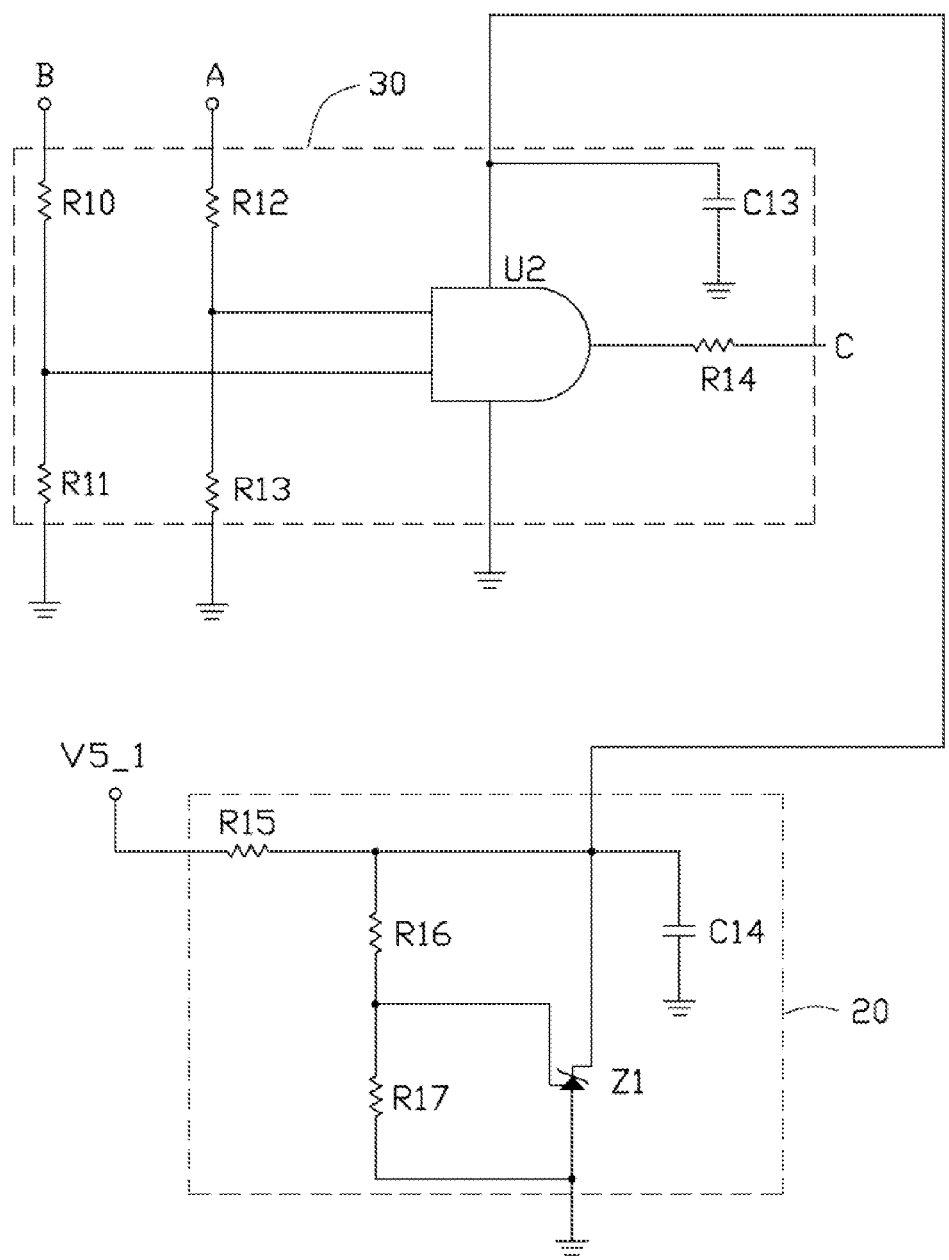

Referring to FIG. 1 to FIG. 4, a measuring apparatus 100 for simulating a hard disk drive (HDD), to output power good (PWG) signals to be measured. The measuring apparatus 100 in accordance with an exemplary embodiment includes a first connector J1, a control circuit 10, a voltage converting circuit 20, and a detecting circuit 30. The first connector J1, the control circuit 10, the voltage converting circuit 20, and the detecting circuit 30 are set on a printed circuit board (not shown). The first connector J1 is electrically connected to a second connector 200 of a motherboard 400. The second connector 200 is electrically connected to a storage controller 300, such as an HDD storage controller, of the motherboard 400.

The control circuit 10 is receives voltage signals from the storage controller 300 of the motherboard 400 through the first connector J1 and the second connector 200, and converts the voltage signals to HDD power signals and outputs the HDD power signals to the detecting circuit 30. The voltage converting circuit 20 converts 5 volts (V) to 3.3V and provides the 3.3V to the detecting circuit 30. The detecting circuit 30 receives the 3.3V from the voltage converting circuit 20 and receives the HDD power signals from the control circuit 10, and outputs a PWG signal to the first connector J1. A measurement device, such as an oscilloscope, can measure the PWG signal.

Ground pins SGND_1-SGND_6 and GND_2-GND_5 of the first connector J1 are grounded. A measuring pin V33_3 of the first connector J1 is connected to the detecting circuit 30. A control pin RSV of the first connector J1 is connected to the control circuit 10. A ground pin GND_1 of the first connector J1 is grounded through a resistor R0. A voltage pin V5_1 of the first connector J1 is connected to the control circuit 10 through a resistor R1. Voltage pins V5_2 and V5_3 of the first connector J1 are connected to the control circuit 10. A voltage pin 12V_1 of the first connector J1 is connected to the control circuit 10 through a resistor R2. Voltage pins 12V_2 and 12V_3 of the first connector J1 are connected to the control circuit 10. In one embodiment, the first connector J1 is an FCI-10034524-001LF connector.

The control circuit 10 includes capacitors C1-C12, resistors R3-R9, a power switch controller U1, and field effect transistors (FETs) Q1 and Q2. An enable pin ENABLE of the power switch controller U1 is connected to the control pin RSV of the first connector J1. A converting pin ISET1 is connected to a converting pin IN1 of the power switch controller U1 through the resistor R4 and then is connected to the voltage pins V12_2 and V12_3 of the first connector J1. A converting pin ISEN2 is connected to a converting pin IN2 of the power switch controller U1 through the resistor R5 and then is connected to the voltage pins V5_2 and V5_3 of the first connector J1. The capacitor C7 is connected between the converting pin IN2 of the power switch controller U1 and ground. The capacitor C8 is connected between the converting pin IN1 of the power switch controller U1 and ground. A voltage pin DISCH1 of the power switch controller U1 is connected to the detecting circuit 30, grounded through the capacitors C1-C3 that are connected in parallel, and connected to a source of the FET Q1. A gate of the FET Q1 is grounded through the capacitor C12 and is connected to a control pin GATE1 of the power switch controller U1 through the resistor R8. A drain of the FET Q1 is connected to a sensing pin ISENSE1 of the power switch controller U1, and is connected to the converting pin IN1 of the power switch controller U1 through the resistor R7. A voltage pin DISCH2 of the power switch controller U1 is connected to the detecting circuit 30, grounded through the capacitors C4-C6 that are connected in parallel, and connected to a source of the FET Q2. A gate of the FET Q2 is grounded through the capacitor C11 and is connected to a control pin GATE2 of the power switch controller U1 through the resistor R9. A drain of the FET Q2 is connected to a sensing pin ISENSE2 of the power switch controller U1 and is connected to the converting pin IN2 of the power switch controller U1 through the resistor R6. The resistor R3 is connected between a data pin FAULT and the voltage pin DISCH2 of the power switch controller U1. Ground pins DGND and AGND of the power switch controller U1 are grounded. The capacitor C9 is connected between a clock pin TIMER of the power switch controller U1 and ground. The capacitor C10 is connected between a register pin VREG of the power switch controller U1 and ground. In one embodiment, the power switch controller U1 is a TPS2320IPWR controller.

The voltage converting circuit 20 includes a silicon controlled rectifier (SCR) Z1, resistors R15-R17, and a capacitor C14. An anode of the SCR Z1 is grounded. A cathode of the SCR Z1 is connected to the detecting circuit 30 and also connected to the voltage pin V5_1 of the first connector J1 through the resistor R15. The resistor R17 is connected between a control terminal and the anode of the SCR Z1. The resistor R16 is connected between the control terminal and the cathode of the SCR Z1. The capacitor C14 is connected between the cathode of the SCR Z1 and ground.

The detecting circuit 30 includes an AND gate U2, resistors R10-R14, and a capacitor C13. A first input terminal of the AND gate U2 is grounded through the resistor R13 and also connected to the voltage pin DISCH1 of the power switch controller U1 through the resistor R12. A second input terminal of the AND gate U2 is grounded through the resistor R11 and also connected to the voltage pin DISCH2 of the power switch controller U1 through the resistor R10. A voltage terminal of the AND gate U2 is connected to the cathode of the SCR Z1 and also grounded through the capacitor C13. A ground terminal of the AND gate U2 is grounded. An output terminal of the AND gate U2 is connected to the measuring pin V33_3 of the first connector J1 through the resistor R14.

In use, the first connector J1 is electrically connected to the second connector 200, for communication of the measuring apparatus 100 with the motherboard 400. The motherboard 400 is powered on, the storage controller 300 identifies the measuring apparatus 100, and outputs a low level signal to the enable pin ENABLE of the power switch controller U1 through the first connector J1 and the second connector 200. Thereby, the power switch controller U1 works and outputs 5V and 12V to the converting pins ISET1, ISET2, IN1, and IN2 of the power switch controller U1. The control pins GATE1 and GATE2 of the power switch controller U1 respectively output high level signals. The FETs Q1 and Q2 are turned on. The voltage pins DISCH1 and DISCH2 of the power switch controller U1 respectively output high level HDD power signals to the first and the second input terminals of the AND gate U2. The AND gate U2 outputs a high level PWG signal to the measuring pin V33_3 of the first connector J1. The measurement device can measure the PWG signal of the measuring pin V33_3 of the first connector J1.

The control circuit 10 receives voltages from the storage controller 300, converts the received voltages to HDD power signals, and provides the HDD power signal to the detecting circuit 30. The detecting circuit 30 outputs a PWG signal according to the received HDD power signals. A measurement device can measure the PWG signal. The measuring apparatus 100 can simulate the HDD to output PWG signals to be measured, to prevent repeated plugging and unplugging of the HDD, thereby preventing potential damage to the HDD.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measuring apparatus for a hard disk driver (HDD), the measuring apparatus comprising:
    a first connector to be connected to a second connector that is connected to a storage controller of a motherboard;
    a control circuit to receive voltage signals from the storage controller through the first and the second connectors and convert the received voltage signals to hard disk drive (HDD) power signals;
    a detecting circuit comprising an AND gate and first to fourth resistors, wherein a first input terminal of the AND gate is grounded through the first resistor and connected to the control circuit through the second resistor, a second input terminal of the AND gate is grounded through the third resistor and connected to the control circuit through the fourth resistor, an output terminal of the AND gate is connected to a measuring pin of the first connector, the AND gate receives the HDD power signals from the control circuit through the first and the second input terminals of the AND gate and outputs a power good (PWG) signal to the measuring pin of the first connector to be measured.

2. The measuring apparatus of claim 1, wherein the detecting circuit further comprises a fifth resistor and a first capacitor, the fifth resistor is connected between the output terminal of the AND gate and the measuring pin of the first connector, the first capacitor is connected to a voltage terminal of the AND gate and ground.

3. The measuring apparatus of claim 2, wherein the control circuit comprises second to ninth capacitors, sixth to twelve resistors, a power switch controller, and first and second field effect transistors (FETs), an enable pin of the power switch controller is connected to a control pin of the first connector, a first converting pin of the power switch controller is connected to a second converting pin of the power switch controller through the sixth resistor and connected to a voltage pin of the first connector, a third converting pin of the power switch controller is connected to a fourth converting pin of the power switch controller through the seventh resistor and connected to a second voltage pin of the first connector, the second capacitor is connected between the fourth converting pin of the power switch controller and ground, the third capacitor is connected between the second converting pin of the power switch controller and ground, wherein a first voltage pin of the power switch controller is connected to the detecting circuit, grounded through the fourth capacitor, and also connected to a source of the first FET, a gate of the first FET is grounded through the fifth capacitor and also connected to a first control pin of the power switch controller through the eighth resistor, a drain of the first FET is connected to a first sensing pin of the power switch controller and also connected to the second converting pin of the power switch controller through the ninth resistor, wherein a second voltage pin of the power switch controller is connected to the detecting circuit, grounded through the sixth capacitor, and also connected to a source of the second FET, a gate of the second FET is grounded through the seventh capacitor and also connected to a second control pin of the power switch controller through the tenth resistor, a drain of the second FET is connected to a second sensing pin of the power switch controller and also connected to the fourth converting pin of the power switch controller through the eleventh resistor, the twelve resistor is connected between a data pin and the second voltage pin of the power switch controller, the eighth capacitor is connected between a clock pin of the power switch controller and ground, the ninth capacitor is connected between a register pin of the power switch controller and ground.

4. The measuring apparatus of claim 3, further comprising a voltage converting circuit, wherein the voltage converting circuit comprises a silicon controlled rectifier (SCR), thirteenth to fifteenth resistors, and a tenth capacitor, an anode of the SCR is grounded, a cathode of the SCR is connected to the voltage terminal of the AND gate and also connected to the first voltage pin of the first connector through the thirteenth resistor, the fourteenth resistor is connected between a control terminal and the anode of the SCR, the fifteenth resistor is connected between the control terminal and the cathode of the SCR, the tenth capacitor is connected between the cathode of the SCR and ground.

* * * * *